United States Patent
Wolf et al.

(10) Patent No.: US 6,830,353 B2
(45) Date of Patent: Dec. 14, 2004

(54) MOTORIZED TILTING DEVICE FOR A SUPPORT PLATE

(75) Inventors: Wilhelm Wolf, Petersaurach (DE); Josef Boegelein, Sachsen (DE); Wolfgang Seiboth, Bad Windsheim (DE); Heinrich Lang, Ergersheim (DE)

(73) Assignee: Oechsler AG, Ansbach (DE)

( * ) Notice: Subject to any disclaimer, the term of this patent is extended or adjusted under 35 U.S.C. 154(b) by 78 days.

(21) Appl. No.: 10/257,593

(22) PCT Filed: Mar. 27, 2001

(86) PCT No.: PCT/EP01/03489

§ 371 (c)(1),
(2), (4) Date: Jan. 29, 2003

(87) PCT Pub. No.: WO01/79029

PCT Pub. Date: Oct. 25, 2001

(65) Prior Publication Data

US 2004/0021965 A1 Feb. 5, 2004

(30) Foreign Application Priority Data

Apr. 12, 2000 (DE) .......................................... 100 18 205

(51) Int. Cl.⁷ .............................................. G02B 7/182
(52) U.S. Cl. ..................................................... 359/877
(58) Field of Search ................................ 359/874, 876, 359/872, 873, 877; 248/479, 480

(56) References Cited

U.S. PATENT DOCUMENTS

| 4,116,538 A | * | 9/1978 | Oskam ........................ 359/874 |
| 4,474,428 A | | 10/1984 | Wunsch et al. |
| 5,467,230 A | | 11/1995 | Rawlings et al. |

FOREIGN PATENT DOCUMENTS

| DE | 3501454 | 9/1986 |
| EP | 0316055 | 5/1989 |

* cited by examiner

*Primary Examiner*—Euncha P. Cherry
(74) *Attorney, Agent, or Firm*—Horst M. Kasper

(57) ABSTRACT

A smoothly operating tilting device (11) for a support plate (12) of a motor-adjustable motor vehicle exterior mirror is disclosed. The plate (12) has an articulating joint to a housing (13), for a rigid mounting. A drive motor (17) is furnished, for each of the both, orthogonal to each other (although arrangeable in any special disposition) tilting directions, which are connected to, at least in parts, flexible positioning rods (18). The above run in an arched guide (22) and are turned from the plane disposed parallel to the plate (12) in to the transverse direction, in order to bridge the mounting gap and connect with an articulated joint to the face of the back side, or the interior of the plate (12), for the transfer of pushing or pulling movements.

7 Claims, 1 Drawing Sheet

MOTORIZED TILTING DEVICE FOR A SUPPORT PLATE

BACKGROUND OF THE INVENTION

1. Field of the Invention

The present invention relates to a motorized tilting device according to the preamble of the main claim.

2. Brief Description of the Background of the Invention Including Prior Art

A device of this type is known from German Patent Application 35 01 454 A1 as a drive for transforming a rotational movement into a translational movement. For this purpose, a worm engages in threaded profiles on the surface of a band made of elastic material, which is guided in the longitudinal direction so that it may have pressure applied to it and is deformable transverse to its broad side. The guide runs—coming out of a linear rail—past the worm engagement in large curves around the worm and the drive motor, which is oriented coaxially thereto and with the worm parallel to the band, and back into the rail. A slide is connected there to one of the two free ends of the band, in order to traverse it along the guide rail and thus move a gate. However, stable mounting and vibration-resistant adjustability of the spatial angle of a support plate for an outside mirror of a truck, for example, cannot be implemented using a slide guide which occupies so much space.

In German Patent Application 33 11 229 A1, the combination of a slider crank drive for a pitching movement with a further drive for converting a rotational movement into a longitudinal movement is provided, behind a shared drive motor, especially for mirror adjustment, but also for adjusting seats and steering wheels in vehicles, for example, in such a way that a rapid pitching movement is superimposed on a slow pivoting movement. To tilt the support plate around a vertical shaft end, a pull rod, which is periodically displaced lengthwise due to an elastic engagement of its opposite end in a rotating worm gear, is linked onto the rear of the plate. Simultaneously, the crank mechanism, which is also linked to the back of the plate, generates an oscillating movement. However, precisely because of the restriction to one single motor shared by both of the movement axes, this represents an adjustment device whose mechanism is very complicated, and which is not vibration resistant due to its many linkage points.

A tilting device of another species is known from European Patent Application 0 316 055 A1 in the form of a housing to receive one reversible small electric motor each for the coordinated drive of each of two tappet-like linear actuators, which may be extended out of the housing and/or withdrawn therein opposite to one another. In this way, they tilt a support plate around an axis centrally transverse to the connection line between the two linear actuators. The requirement of having to simultaneously use two motorized drives acting oppositely coordinated for this simple pivot movement of a mirror support plate around a pivot axis is, however, very costly. In addition, the operational reliability is impaired due to the danger of not exactly synchronized operation; if the two linear actuators are not moved exactly opposite by their motors, then a reproducible tilting movement of the support plate around a predetermined fixed geometric axis does not occur, but rather this pivot axis experiences a lateral displacement.

SUMMARY OF THE INVENTION

3. Purposes of the Invention

The present invention is based on the technical problem of designing a tilting device, particularly for the support plate of a truck outside mirror, with lower outlay for individual parts and more functional robustness, at least in regard to reproducible and vibration-resistant adjustability.

BRIEF DESCRIPTION OF THE INVENTION

This object is achieved according to the present invention in that, according to the essential features indicated in the main claim, the motorized pivot movement for each pivot axis of the plate is performed using at least one adjustment rod, which, on both sides of a linear, toothed central region, on which a motor pinion engages, turns into a curved region, which may have tension or pressure loads applied to it like the central region due to its material selection or its constructive guide. These adjustment rods, which comprise different regions and are only necessarily toothed in their central region, are therefore not necessarily toothed rods which are constructively costly since they are continuously flexible per se.

The support plate is preferably centrally, e.g., spherically, mounted on its back side, opposite its mirror surface, on the housing. The flexible regions of the adjustment rods on both sides of the linear toothed rod region—mounted in the housing so it is longitudinally displaceable approximately parallel to the support plate by the adjustment motor via a reduction drive—each first run into the housing through a curved guide and then out of the housing to the support plate supported in front of it, onto whose back side they are linked using their front ends. If the motor displaces the toothed region to tilt the mirror plate, a flexible region of the adjustment rod is therefore subjected to a tensile load and the opposite region is subjected to a compressive load.

Both of the flexible regions on both sides of the central (toothed) section of the rod preferably turn, before their free front ends, back into stiff end pieces, which pass through a linear guide as they exit out of the housing and then are linked onto the back of the support plate at two points—which are diametrically opposite one another in relation to the mounting of the plate on the housing. For this linkage, the technology of snap connections having spherical overlap surfaces as joints for movement transmission may be used, as may be produced without problems and with functional reliability in plastic injection molding.

A similar adjustment rod, which is driven by a motor in its toothed central region, may be aligned transverse to the first mentioned, in order to be able to carry out the pivot movement of the spherically mounted plate around two axes—and also with simultaneous superposition in any arbitrary spatial direction.

In any case, as the plate is tilted around an axis, one half of the adjustment rod, which is curved, is subjected to a compressive load and its opposing half is subjected to a tensile load, which ensures a pivot drive able to be subjected to high mechanical stress and operating without vibration or pinching, at least if the plate is tiltable around a constructively defined point of rotation—due to its spherical linkage mounting on the housing—and is broadly supported on two further points at a distance to one another via the end pieces of the respective rods. Therefore, according to the present invention, in a stably operating tilting device, particularly for the support plate of a motor vehicle outside mirror adjustable by a motor, the plate is mounted using an articulated joint on a housing which is to be mounted in a fixed location, in which a drive motor is positioned, for each of the two orthogonal pivot directions (which may also be superimposed into any desired spatial direction), which engages with a longitudinally movable adjustment rod which is toothed in at least some regions and flexible in at least some regions. This rod is deflected, on both sides of its central toothed section, in curved guides out of the plane parallel to the plate into the transverse direction in order to exit out of the housing, where its end pieces—after bridging the mounting distance between the housing and the plate—are connected using an articulated joint to the back side or the inside of the plate to transmit pushing and pulling movements at their faces.

For a more detailed explanation of the present invention and its alterations and refinements, reference is made to the sub-claims and the following description of a preferred exemplary embodiment of the achievement of the object according to the present invention, which is shown in the drawing not entirely to scale and abstracted to the elements essential to its function. The single figure of the drawing shows a cross-section of a housing, to be mounted fixed on object, for the tilting device for tipping a support plate in all spatial directions.

DESCRIPTION OF INVENTION AND PREFERRED EMBODIMENT

Figure 1:
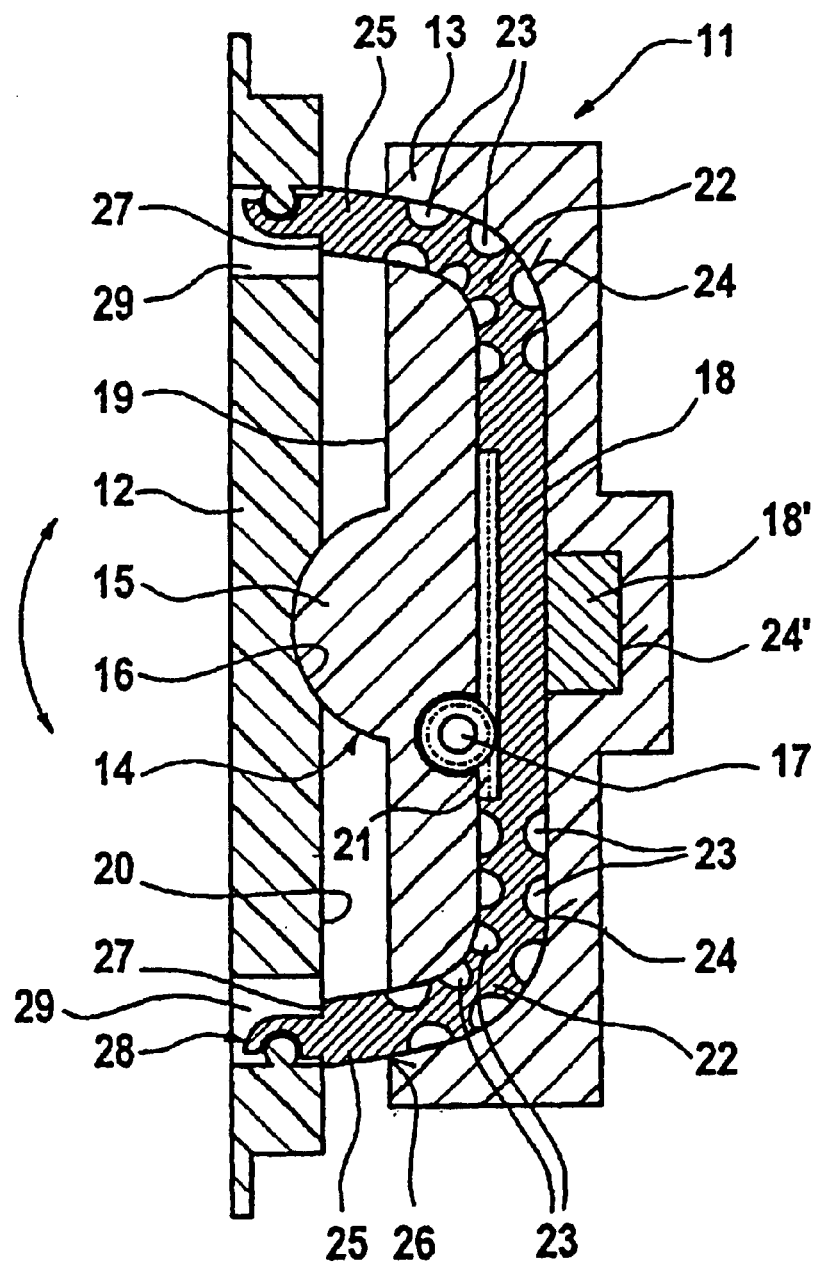
FIG. 1 is a sectional view of a casing for the motorized tilting device.

The motorized drive arrangement of tilting device 11 according to the present invention, for a support plate 12 for receiving, for example, a motor vehicle outside mirror which is adjustable using a motor, is located inside a flat housing 13, which is to be mounted in a fixed location. This housing is equipped on one of its two large external surfaces, support side 19, with a joint 14 in the form of a spherical cap 15, on which plate 12 is supported using a rear spherical shell 16 so it may be tilted in all spatial directions.

Inside housing 13, a low-voltage geared motor 17 is positioned for each of two orthogonal pivot movement possibilities of plate 12. The motor is mechanically linked to toothed central region 21 of an adjustment rod 18, in order to displace this rod, according to the motor rotational direction, along a guide 24 running approximately parallel to the main plane of housing 13 and plate 12.

Further guide 24 for adjustment rod 18 then runs, on both sides of the toothed region for the engagement of drive motor 17, in a curved shape transverse to the surface of support side 19, in order to open here toward back side 20 of plate 12. In any case, adjustment rod 18 has a flexible region 22, adjoining its linearly guided toothed region 21, whose length is delimited, which is nonetheless relatively rigid in a lengthwise direction or at least guided so it is resistant to buckling, i.e., transmits external tensile and compressive loads. This property of flexible region 22 may be achieved by the material selection such as implementation using soft material in at least some sections of otherwise stiff adjustment rod 18 or, as shown, through localized cross-sectional weakening such as that due to constructive design, particularly through mutual notches 23, offset out of the cross-sectional plane, in the lateral surface of flexible region 22.

However, end piece 25 of adjustment rod 18, which is flexible in some regions, exiting out of housing 13 out of the curved region of guide 24 in the direction toward plate back side 20, is preferably—like central toothed region 21—stiff again, in order to experience an orientation fixed to the housing through a guide opening 26. In this direction, free front end 27 is linked onto plate 12 after traversing the distance in front of housing support side 19 determined by cap 15 and shell 16. Plate 12 is thus supported on cap 15 using adjustment rod 18, which exits out of housing 13 and is flexible at least in at least some regions (22). As shown, articulated connection 28 preferably lies inside plate 12, implemented, for example, as a ball joint loaded transverse to the overlap in a cavity 29, which is on the back of or traverses plate 12.

If, as illustrated, adjustment rod 18 is connected on both sides of toothed region 21, via a region 22 flexibly supported in the curved guide, to a stiff end piece 25 geometrically guided out of housing 13, this provides the advantage of a vibration-resistant symmetric support of plate 12 on central joint 14 and interference-free adjustment procedures, because, with the tilting movement (indicated by the curved double arrow in the drawing in front of mirror support plate 12) a tensile load and simultaneously a compressive load, diametrically opposite in relation to joint 14, of adjustment rod 18 occurs at a plate connection 28.

In housing 13, in a plane offset in relation to the plane of toothed section 21 considered up to this point, a further adjustment rod 18', running orthogonal thereto, which has a drive motor (17), is positioned in a curved guide 24', in order to be linked onto plate 12 running transverse to the sectional direction shown. In this way, a pivot movement orthogonal to the double arrow shown is controlled; a superposition of both pivot directions leading to arbitrary movements (only limited by stops which are required by the construction) in space of plate 12 mounted on spherical cap 15.

What is claimed is:
1. A motorized tilting device (11) for a plate (12)—which has a mechanical connection to a motor (17) and wherein the plate (12) is curved guided through a housing (13) fixed to an object, characterized in that the plate (12) is a support plate (12), particularly for receiving a motor vehicle mirror, which is tiltable in relation to the housing (13) and is mounted on its back side on the housing (13) and is linked to an adjustment rod (18), which runs, using two flexible regions (22) on both sides of a central toothed region (21), through curved guide (24) and then through guide openings (26) pointing toward the plate (12), exiting out of the housing (13), where its free front ends (27) are linkedusing articulated joints to two points, which are diametrically opposite in relation to a mounting, on the back side (20) of the plate (12).

2. The tilting device according to claim 1, characterized in that the central toothed region (21) of the adjustment rod (18) turns into an end piece (25), which is connected to the plate (12) using an articulated joint and is stiff in contrast to the flexible region and which exits out of the guide opening (26) in an orientation fixed in relation to the housing, on both sides via a flexible region (22), which runs in a curved guide (24).

3. The tilting device according to claim 1, characterized in that two adjustment rods (18, 18'), which are movable independently from one another, are positioned in different planes in the housing (13) and are connected in mutually orthogonal orientation to the plate (12).

4. The tilting device according to claim 1, characterized in that an articulated connection (28) of the front end (27) of the adjustment rod (18) is provided behind or in the plate (12).

5. The tilting device according to claim 1, characterized in that a spherical cap-spherical shell combination (15–16) is provided as an articulated mounting of the plate (12) on the housing (13).

6. The tilting device according to claim 1, characterized in that a deformable but only slightly compressible material is used for the deflection region (22) of the adjustment rod (18).

7. The tilting device according to claim 1, characterized in that the adjustment rod (18) has regions in the deflection region (22) which are weakened over their cross-section.

* * * * *